(12) United States Patent
Waycuilis et al.

(10) Patent No.: US 6,703,534 B2
(45) Date of Patent: *Mar. 9, 2004

(54) TRANSPORT OF A WET GAS THROUGH A SUBSEA PIPELINE

(75) Inventors: John J. Waycuilis, Cypress, TX (US); Stephen D. York, Missouri City, TX (US)

(73) Assignee: Marathon Oil Company, Findlay, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/877,798

(22) Filed: Jun. 8, 2001

(65) Prior Publication Data

US 2002/0120172 A1 Aug. 29, 2002

Related U.S. Application Data

(63) Continuation-in-part of application No. 09/476,297, filed on Dec. 30, 1999, now Pat. No. 6,350,928.

(51) Int. Cl.$^7$ .............................. C07C 9/00; F17C 7/00
(52) U.S. Cl. ........................................ 585/15; 62/45.1
(58) Field of Search .............................. 585/15; 62/45.1

(56) References Cited

U.S. PATENT DOCUMENTS

| | | | |
|---|---|---|---|
| 2,475,255 A | | 7/1949 | Rollman ............... 62/170 |
| 3,514,274 A | * | 5/1970 | Cahn et al. ............... 585/15 |
| 3,991,816 A | | 11/1976 | Klaren ............... 165/1 |
| 4,220,193 A | | 9/1980 | Klaren ............... 165/1 |
| 4,398,594 A | | 8/1983 | Klaren ............... 165/104.16 |
| 5,351,756 A | * | 10/1994 | Minkkinen et al. ......... 166/267 |
| 5,473,904 A | * | 12/1995 | Guo et al. ............... 62/46.1 |
| 5,536,893 A | * | 7/1996 | Gudmundsson ............ 585/15 |
| 5,941,096 A | * | 8/1999 | Gudmundsson ............ 62/633 |
| 6,082,118 A | * | 7/2000 | Endrizzi et al. ............ 62/46.1 |
| 6,180,843 B1 | | 1/2001 | Heinemann et al. ......... 585/15 |
| 6,245,955 B1 | * | 6/2001 | Smith ............... 585/15 |
| 6,313,361 B1 | * | 11/2001 | Waycuilis ............... 585/314 |
| 6,350,928 B1 | * | 2/2002 | Waycuilis et al. ......... 585/15 |

FOREIGN PATENT DOCUMENTS

WO  WO9827033 A1  6/1998
WO  WO9919282 A1  4/1999

OTHER PUBLICATIONS

J. S. Gudmundsson et al., "Hydrate Concept for Capturing Associated Gas", SPE 50598, pp. 247–257, presented at 1998 SPE European Petroleum Conference, Oct. 20–22, 1998.
BG Hydrates Workshop, Gas Research Technology Centre, May 24–25, 1999.
J. S. Gudmundsson et al., "NGH on FPSO —Slurry Process and Cost Estimate", SPE 56629, presented at 1999 SPE Annual Technical Conference, Oct. 3–6, 1999.
"Fluidized–Bed Heat Exchanger Avoids Fouling Problems", Chemical Engineering, Feb. 1988, p. 43.
Klaren et al., "The Non–Fouling Fluidized Bed Heat Exchanger", American Society of Mechanical Engineers, Heat Transfer Equipments Fundamentals, Design, Applications and Operating Problems, vol. 108, Book No. H00500, Jan. 1989, pp. 273–279.
"Consider Nonfouling Fluidized Bed Exchangers", Hydrocarbon Processing, Jul. 1989, pp. 48–50.

* cited by examiner

*Primary Examiner*—Walter D. Griffin
(74) *Attorney, Agent, or Firm*—Jack E. Ebel

(57) ABSTRACT

A transport process for a wet gas employs a subsea heat exchanger having first and second flowpaths separated by a heat transfer surface. A cooler heat transfer medium is conveyed through the first flowpath in a liquid phase while a warmer hydrocarbon stream having a gaseous hydrocarbon phase and a liquid aqueous phase is conveyed through the second flowpath, which cools the hydrocarbon stream and heats the heat transfer medium. The heat transfer medium is converted by heating to a vapor phase, which is conveyed to a passive condenser associated with the subsea heat exchanger. The ambient temperature of the sea water submersing the condenser cools the heat transfer medium and restores it to the liquid phase for reuse in the heat exchanger. A portion of the hydrocarbon stream is converted by cooling to a plurality of solid gas hydrate particles while a solid particle medium entrained within the hydrocarbon stream prevents the build-up of gas hydrate particles in the second flowpath. The gas hydrate particles mix with the remaining liquid phase components of the hydrocarbon stream to form a gas hydrate slurry, which is withdrawn from the second flowpath and conveyed through a subsea transport pipeline.

24 Claims, 4 Drawing Sheets

TRANSPORT OF A WET GAS THROUGH A SUBSEA PIPELINE

This a continuation-in-part application of Ser. No. 09/476,297 filed on Dec. 30, 1999, now U.S. Pat. No. 6,350,928.

TECHNICAL FIELD

The present invention relates generally to transport of a wet gas and, more particularly, to a process for converting a hydrocarbon stream containing a gas phase and a liquid phase to a stable gas hydrate slurry and transporting the resulting gas hydrate slurry through a subsea gas pipeline.

BACKGROUND OF THE INVENTION

Gas streams, such as natural gas, produced from offshore wells are often transported under high pressure from the subsea well head through a subsea gas transport pipeline to a surface locale, such as a host platform or other surface facility, for processing or distribution. In many cases a liquid aqueous phase and a gaseous hydrocarbon phase coexist in the produced gas stream, which is fed from the well head into the subsea gas transport pipeline. Produced gas streams, which contain a liquid aqueous phase and a gaseous hydrocarbon phase, are termed wet gas.

At the temperature and pressure conditions frequently encountered in subsea gas transport pipelines, the gas and liquid phases of a wet gas readily react to form solid gas hydrates. The solid gas hydrates can undesirably occlude the subsea gas transport pipeline by building up on the interior walls of the pipeline, ultimately aggregating into a plug or blockage. The present invention recognizes a need for a cost-effective solution to the problem of transporting a wet gas via subsea gas transport pipeline while avoiding substantial occlusion of the pipeline with aggregated solid gas hydrates. As such, the present invention is a process for efficiently transporting a wet gas via a subsea gas transport pipeline. The present process converts the wet gas to a gas hydrate slurry comprising solid gas hydrate particles suspended in a continuous liquid phase before feeding the wet gas into the subsea gas transport pipeline, which preempts the formation and aggregation of solid gas hydrates in the pipeline during transport of the wet gas.

Several methods are known in the prior art for producing solid gas hydrates, but none are deemed satisfactory for the process of the present invention. For example, U.S. Pat. No. 5,536,893 to Gudmundsson teaches a method for producing gas hydrates in the form of a fluffy powder by spraying chilled liquid water into a cooled gas. PCT Patent Application WO9827033A1 to Heinemann et al. teaches a method for producing gas hydrates by adiabatically expanding a mixture of water and a cooled compressed gas across a nozzle to a lower pressure. Expansion of the mixture atomizes the water and produces solid gas hydrates. PCT Patent Application WO9919282A1 to Heinemann et al. teaches a method for producing gas hydrates in a fluidized bed reactor by conveying a gas phase upward to fluidize a bed of solid particles, while contacting the gas phase with a downwardly flowing chilled liquid water phase. All of the above-recited methods for producing gas hydrates are relatively inefficient because gas hydrate formation is an exothermic reaction and the evolution of latent heat in the reaction undesirably limits conversion. The above-recited methods require substantial preliminary sub-cooling of the feed streams or large adiabatic pressure drops, both of which substantially increase the cost and complexity of practicing the method.

It is an object of the present invention to provide an effective process for transporting a wet gas, while substantially avoiding pipeline occlusion due to solid gas hydrate accumulation. More particularly, it is an object of the present invention to provide a process for efficiently converting a wet gas to a gas hydrate slurry, wherein the gas hydrate slurry is suitable for transport through a subsea gas transport pipeline. It is another object of the present invention to provide a process for transporting a gas hydrate slurry through a subsea gas transport pipeline, wherein the process is relatively insensitive to the length or depth of the subsea pipeline. It is another object of the present invention to provide a process for converting a wet gas to a gas hydrate slurry by cooling the wet gas with a phase-change heat transfer medium in a heat exchanger, wherein the condenser for the heat transfer medium associated with the heat exchanger is relatively energy efficient. These objects and others are achieved in accordance with the invention described hereafter.

SUMMARY OF THE INVENTION

The present invention is a process for transporting a wet gas through a subsea pipeline. The process employs a heat exchanger submersed in a body of water proximal to a subsea well head. The heat exchanger has a first heat exchanger flowpath for a heat transfer medium at an initial lower temperature and a second heat exchanger flowpath for a hydrocarbon stream at an initial higher temperature. The hydrocarbon stream, which is typically a natural gas production stream from an offshore well, includes a gas phase comprising a gaseous hydrocarbon component and an initial liquid phase comprising a liquid aqueous component. The first heat exchanger flowpath has a first inlet and a first outlet and the second heat exchanger flowpath has a second inlet and a second outlet. The first heat exchanger flowpath is separated from the second heat exchanger flowpath by an exchanger heat transfer surface in heat conductive communication with the first and second heat exchanger flowpaths.

A liquid phase portion of the heat transfer medium is conveyed from the first inlet through the first heat exchanger flowpath toward the first outlet. Contact between the exchanger heat transfer surface and the heat transfer medium raises the initial lower temperature of the heat transfer medium to a vaporization temperature and converts the liquid phase portion of the heat transfer medium to a vapor phase portion.

A solid particle medium is entrained within the hydrocarbon stream to form a fluidizable mixture, which is conveyed through the second heat exchanger flowpath. Contact between the exchanger heat transfer surface and the hydrocarbon stream lowers the initial temperature of the hydrocarbon stream to a gas hydrate formation temperature and converts a portion of the hydrocarbon stream to a plurality of solid gas hydrate particles. The solid particle medium minimizes buildup of the solid gas hydrate particles on the exchanger heat transfer surface. The plurality of solid gas hydrate particles and remaining portion of the initial liquid phase in combination form a gas hydrate slurry. The gas hydrate slurry is withdrawn from the second heat exchanger flowpath via the second outlet and fed to a submersed transport pipeline. The transport pipeline extends from the heat exchanger, which is at a lower depth in the body of water, to a desired destination, which is at a higher depth in the body of water. As the gas hydrate slurry is conveyed through the transport pipeline from the lower depth to the higher depth, the temperature of the gas hydrate slurry rises, which inhibits the formation of additional solid gas hydrate particles within the transport pipeline.

A condenser, likewise submersed in the body of water, is provided in association with the heat exchanger. The condenser has a condenser inlet, a condenser outlet and a condenser flowpath angling downward from the inlet to the outlet. The condenser flowpath is enclosed by a condenser heat transfer surface, which is in heat conductive communication with the condenser flowpath. The body of water immersing the condenser heat transfer surface has an ambient temperature substantially less than the vaporization temperature of the heat transfer medium. The vapor phase portion of the heat transfer medium is conveyed from the first outlet of the first heat exchanger flowpath into the condenser inlet and through the condenser flowpath toward the condenser outlet. Contact between the condenser heat transfer surface and the heat transfer medium cools the heat transfer medium to a temperature below the vaporization temperature and reconverts the vapor phase portion to the liquid phase portion. The liquid phase portion is conveyed back from the condenser outlet to the first inlet of the first heat exchanger flowpath.

The invention will be further understood from the accompanying drawings and description.

DESCRIPTION OF PREFERRED EMBODIMENTS

Figure 1:
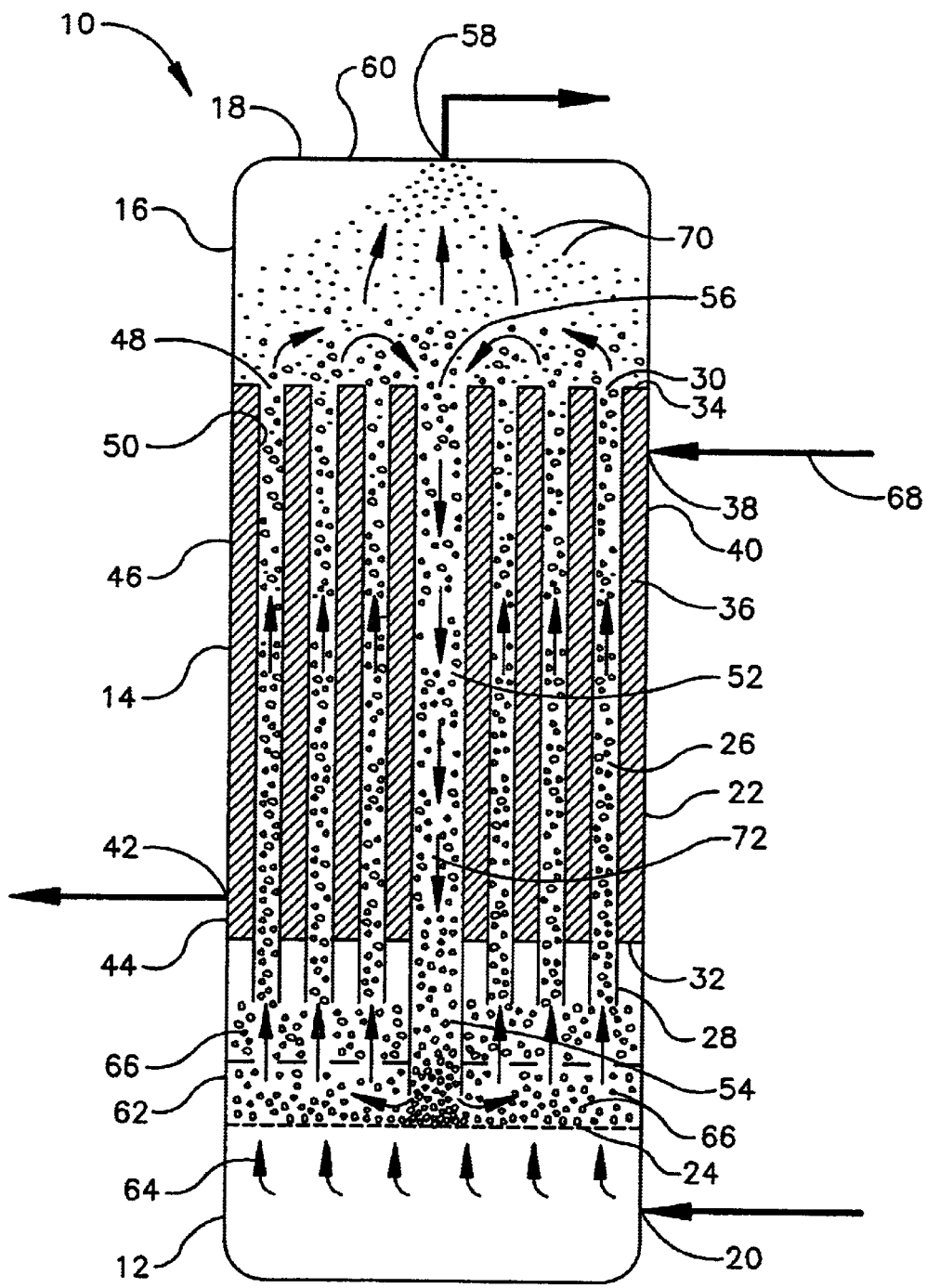
FIG. 1 is a conceptualized cross-sectional view of a first embodiment of a fluidized bed heat exchanger, which is employed in a heat exchanger/condenser system having utility in the process of the present invention.

Referring to FIG. 1, a vertically-oriented tubular fluidized bed heat exchanger (FBHX) is shown and designated 10. The FBHX 10 is substantially similar to those disclosed in U.S. Pat. Nos. 3,991,816; 4,220,193; and 4,398,594; incorporated herein by reference. However, the FBHX 10 is specifically adapted for use in the wet gas transport process of the present invention. The FBHX 10 is characterized by an internally circulating fluidized bed. The FBHX 10 is functionally partitioned into a plurality of vertically stratified chambers including a lower chamber 12, a middle chamber 14, and an upper chamber 16. The lower chamber 12 is functionally defined as a mixing zone, the middle chamber 14 is functionally defined as a heat transfer zone, and the upper chamber 16 is functionally defined as a separation zone. A shell 18 surrounds the FBHX 10, defining a continuous vessel, which encloses the lower, middle, and upper chambers 12, 14, 16.

The chambers 12, 14, 16 are provided with specific elements, which enable the above-recited functions. In particular, the lower chamber 12 is provided with a hydrocarbon stream inlet port 20, which opens into the lower chamber 12 through a vertical side 22 of the shell 18. A perforated distribution plate 24 is horizontally disposed across the lower chamber 12 above the hydrocarbon stream inlet port 20, effectively horizontally bisecting the lower chamber 12. The middle chamber 14 is provided with a plurality of substantially parallel open-ended riser tubes 26, which are vertically disposed within the middle chamber 14. The lower ends 28 of the tubes 26 are open to the lower chamber 12, while the upper ends 30 of the tubes 26 are open to the upper chamber 16. A lower tube plate 32 is positioned proximal to the lower ends 28 at the interface between the lower and middle chambers 12, 14. An upper tube plate 34 is correspondingly positioned proximal to the upper ends 30 at the interface between the middle and upper chambers 14, 16. The tubes 26 are spatially separated from one another, providing an interstitial space 36 between the tubes 26. The lower tube plate 32 and upper tube plate 34 prevent fluid communication between the interstitial space 36 and the lower and upper chambers 12, 16, respectively.

The middle chamber 14 is provided with a heat transfer medium inlet port 38, which opens into an upper portion 40 of the middle chamber 14 through the vertical side 22 of the shell 18. The middle chamber 14 is further provided with a heat transfer medium outlet port 42, which exits from a lower portion 44 of the middle chamber 14 through the opposite vertical side 46 of the shell 18. The heat transfer medium inlet port 38, interstitial space 36, and heat transfer medium outlet port 42 define a heat transfer medium flowpath through the FBHX 10. The heat transfer medium flowpath is in fluid isolation from the lower and upper chambers 12, 16 and the tube interiors 48, which define a fluidizable mixture flowpath through the FBHX 10. However, the external side of the tube walls 50 is in fluid contact with the heat transfer medium flowpath at the interface between the tubes 26 and the interstitial space 36. An internal downcomer 52 is vertically and centrally disposed within the middle chamber 14. The internal downcomer 52 is in substantially parallel alignment with the tubes 26 and has a substantially greater inside diameter than the tubes 26. The internal downcomer 52 has a lower end 54, which is open to the lower chamber 12, and an upper end 56, which is open to the upper chamber 16. The upper chamber 16 is an essentially open head space or freeboard. The upper chamber 16 is provided with a gas hydrate slurry outlet port 58, which exits from the upper chamber 16 through the top 60 of the shell 18. The gas hydrate slurry outlet port 58 may be connected to a storage tank or transport means such as a pipeline or a motorized tanker transport vehicle (not shown).

Operation of the FBHX 10 is effected by feeding a hydrocarbon stream to the lower chamber 12 of the FBHX 10 via the hydrocarbon stream inlet port 20. The hydrocarbon stream contains an initial liquid phase and an initial gas phase. The initial liquid phase comprises a liquid aqueous component and the initial gas phase comprises a gaseous hydrocarbon component. In general, the liquid aqueous component is a fresh water or brine, which coexists in a mixture with the gaseous hydrocarbon component and is naturally-occurring, i.e., has not been intentionally added to the hydrocarbon stream by the practitioner. Thus, for example, the hydrocarbon stream may be a production stream from a subterranean formation, wherein the gaseous hydrocarbon component is natural gas and the liquid aqueous component is brine from the formation and/or is water condensed from the gaseous hydrocarbon component upon cooling. The liquid aqueous component concentration in the hydrocarbon stream is typically in a range of about 1 to 5% by weight. The initial liquid phase may optionally contain one or more other liquid components in addition to the liquid aqueous component, such as a liquid hydrocarbon component or a liquid additive component. The liquid additive component may be any liquid component, such as an additive water, which the practitioner may intentionally add to the hydrocarbon stream to facilitate formation of the gas hydrate slurry or to enhance the properties of the resulting gas hydrate slurry, as described hereafter. The liquid hydrocarbon component may be any hydrocarbon liquid, which coexists in a mixture with the gaseous hydrocarbon component and liquid aqueous component, such as a condensate produced in a production stream from a subterranean formation.

The hydrocarbon stream enters the lower chamber 12 at a rate of about 10,000 to 15,000 kg/hr, a temperature in a range of about 10 to 30° C., and a pressure in a range of about 5,000 to 35,000 kPa. The hydrocarbon stream is conveyed upward through the distributor plate 24, which uniformly distributes the hydrocarbon stream radially across an upper portion 62 of the lower chamber 12 as shown by the arrows 64. Immediately after passing through the distributor plate 24, the multi-phase fluid contacts a solid particle medium 66, which resides in the upper portion 62 of the lower section 12. The solid particle medium 66 is a plurality of divided particles formed from a substantially inert, hard, abrasive material, such as chopped metal wire, gravel, or beads formed from glass, ceramic or metal. The hydrocarbon stream is conveyed upward through the upper portion 62 at a superficial velocity, which substantially entrains the solid particle medium 66, to form a fluidizable mixture comprising the hydrocarbon stream and the solid particle medium 66. More particularly, the hydrocarbon stream is conveyed through the upper portion 62 at a superficial velocity, which is sufficient to fluidize the solid particle medium 66, wherein the hydrocarbon stream constitutes the fluidizing medium and the entrained solid particle medium 66 constitutes the fluidized bed.

The fluidizable mixture passes from the lower chamber 12 upward into the open lower ends 28 of the tubes 26 and through the tube interiors 48 within the middle chamber 14. A heat transfer medium is simultaneously conveyed into the middle chamber 14 via the heat transfer medium inlet port 38. The heat transfer medium is a phase-change refrigerant fluid for, which both vapor and liquid phases coexist at the ambient conditions of the present process. An exemplary heat transfer medium exhibiting the above-recited characteristics is propane in both the liquid and vapor phases. The heat transfer medium enters the middle chamber 14 at a rate of about 20,000 to 30,000 kg/hr, a temperature in a range of about 0 to 20° C., and a pressure in a range of about 100 to 10,000 kPa. The heat transfer medium passes downward through the interstitial space 36 until reaching the heat transfer medium outlet port 42 where the heat transfer medium is discharged as shown by arrows 68.

The heat transfer medium is in continuous contact with the external side of the tube walls 50 during its descent through the chamber section 14, while the fluidizable mixture is in continuous contact with the internal side of the tube walls 50 during its ascent through the middle chamber 14. The tube walls 50 are formed from a heat conductive material, which provides an effective exchanger heat transfer surface for cooling the hydrocarbon stream flowing through the tube interiors 48. The heat transfer medium cools the hydrocarbon stream in the middle chamber 14 from the above-recited temperature range to a cooled temperature range of about 5 to 25° C., which is below the minimum gas hydrate formation temperature of the hydrocarbon stream. Thus, the heat transfer medium sufficiently cools the hydrocarbon stream in the middle chamber 14 to cause gas hydrate formation. In particular, at least a portion of the liquid aqueous component in the initial liquid phase and at least a portion of the gaseous hydrocarbon component in the initial gas phase react to form a plurality of unconsolidated solid gas hydrate particles 70 in the tube interiors 48. Preferably either all of the liquid aqueous phase or all of the gaseous hydrocarbon phase in the hydrocarbon stream is consumed by the conversion reaction. The resulting solid gas hydrate particles 70 typically have a crystalline structure within a very small controlled size range of about 0.1 to 1.0 mm, which renders the solid gas hydrate particles 70 relatively benign, i.e., resistant to agglomeration. The solid gas hydrate particles 70 are likewise entrained in the fluidizing medium as the fluidizable mixture passes upward through the tube interiors 48.

The solid particle medium 66 experiences turbulent flow while it is fluidized within the tube interiors 48, causing the solid particle medium 66 to collide with the internal sides of the tube walls 50 and with the solid gas hydrate particles 70 entrained in the fluidizable mixture. The collisions produce a scouring action, diminishing the ability of the solid gas hydrate particles 70 to accumulate on the internal sides of the tube walls 50 and displacing any solid gas hydrate particles 70 which adhere thereto. Thus, the solid particle medium 66 substantially prevents or reduces fouling or plugging of the tube interiors 48 caused by solid gas hydrate particle build-up. The collisions also control the ultimate size of the solid gas hydrate particles 70.

The fluidizable mixture continues out the open upper ends 30 of the tubes 26 into the upper chamber 16. When the fluidizable mixture reaches the upper chamber 16, it disperses causing the more dense solid particle medium 66 to separate by gravity from the less dense solid gas hydrate particles 70 and the remaining fluid components of the hydrocarbon stream. The remaining fluid components comprise the remaining portion of the initial liquid phase and the remaining portion of the initial gas phase, if any. The remaining portion of the initial liquid phase may be one or more of the following components: excess liquid aqueous component, a liquid additive component or a liquid hydrocarbon component. The remaining portion of the initial gas phase, if any, is excess gaseous hydrocarbon component.

The internal downcomer 52 enables auto-recirculation of the separated solid particle medium 66. In particular, the solid particle medium 66 returns to the lower chamber 12 by falling under the force of gravity from the upper chamber 16 into the axially aligned open upper end 56 of the internal downcomer 52, passing downwardly through the internal downcomer 52, and exiting the internal downcomer 52 via the open lower end 54 into the lower chamber 12 as shown by the arrows 72. The solid gas hydrate particles 70 remain suspended in the remaining portion of the initial liquid phase to provide a stable gas hydrate slurry recoverable from the upper chamber 16 via the gas hydrate slurry outlet port 58.

The gas hydrate slurry comprises a slurry solid phase suspended in a slurry liquid phase. The slurry solid phase is the solid gas hydrate particles 70, which make up about 1 to 75% by weight of the gas hydrate slurry. The remainder of the gas hydrate slurry is made up of the slurry liquid phase, which is the remaining portion of the initial liquid phase. The gas hydrate slurry is withdrawn from the upper chamber 16 via the gas hydrate slurry outlet port 58 at a rate of about 9,000 to 15,000 kg/hr, a temperature in a range of about 1 to 25° C., and a pressure in a range of about 4,500 to 34,900 kPa. Where the initial gas phase is the limiting reactant, a remaining portion of the initial gas phase may be mixed with the gas hydrate slurry when it exits the gas hydrate slurry outlet port 58. The remaining portion of the initial gas phase, if any, is usually relatively small, making up only about 0 to 10% by volume of the material exiting the gas hydrate slurry outlet port 58. In any case, the gas hydrate slurry exiting the gas hydrate slurry outlet port 58 is conveyed to a gas transport pipeline (not shown in FIG. 1).

As noted above, the practitioner may optionally add liquid additive components to the hydrocarbon stream, particularly in cases where either the liquid aqueous component or the gaseous hydrocarbon component is the limiting reactant in the gas hydrate formation reaction. Where the liquid aqueous component is the limiting reactant, substantially all of the liquid aqueous component is converted to solid gas hydrate particles 70, while the excess gaseous hydrocarbon component remains. The excess gaseous hydrocarbon component, which constitutes the remaining portion of the initial gas phase, can exit the FBHX 10 mixed with the gas hydrate slurry. Alternatively, an additive water can be added to the hydrocarbon stream to convert all of the excess gaseous hydrocarbon component to solid gas hydrate particles 70 so that substantially no free hydrocarbon gas remains in the product of the FBHX 10, which exits the upper chamber 16.

Since the gas hydrate slurry requires at least one liquid component, the requirement may be satisfied by the presence of a naturally-occurring liquid hydrocarbon component in the hydrocarbon stream. If no liquid hydrocarbon component is present in the hydrocarbon stream, the requirement may be satisfied by adding a liquid additive component to the hydrocarbon stream. The liquid additive component is preferably an additive water and more preferably an additive brine due to its low cost availability, although other liquid additive components such as an additive fresh water or an additive hydrocarbon liquid may likewise be employed. Additive brines include filtered sea water or brines produced from subterranean formations in association with hydrocarbon production operations. In any case, the liquid additive component is added to the hydrocarbon stream either before it is fed to the FBHX 10, while it is in the FBHX 10, or after it exits the FBHX 10. Where the gaseous hydrocarbon component is the limiting reactant, all of the gaseous hydrocarbon component is converted to solid gas hydrate particles 70, while the excess liquid aqueous component remains. The excess aqueous component exits the FBHX 10 as at least a part of the remaining portion of the initial liquid phase of the gas hydrate slurry.

Figure 2:
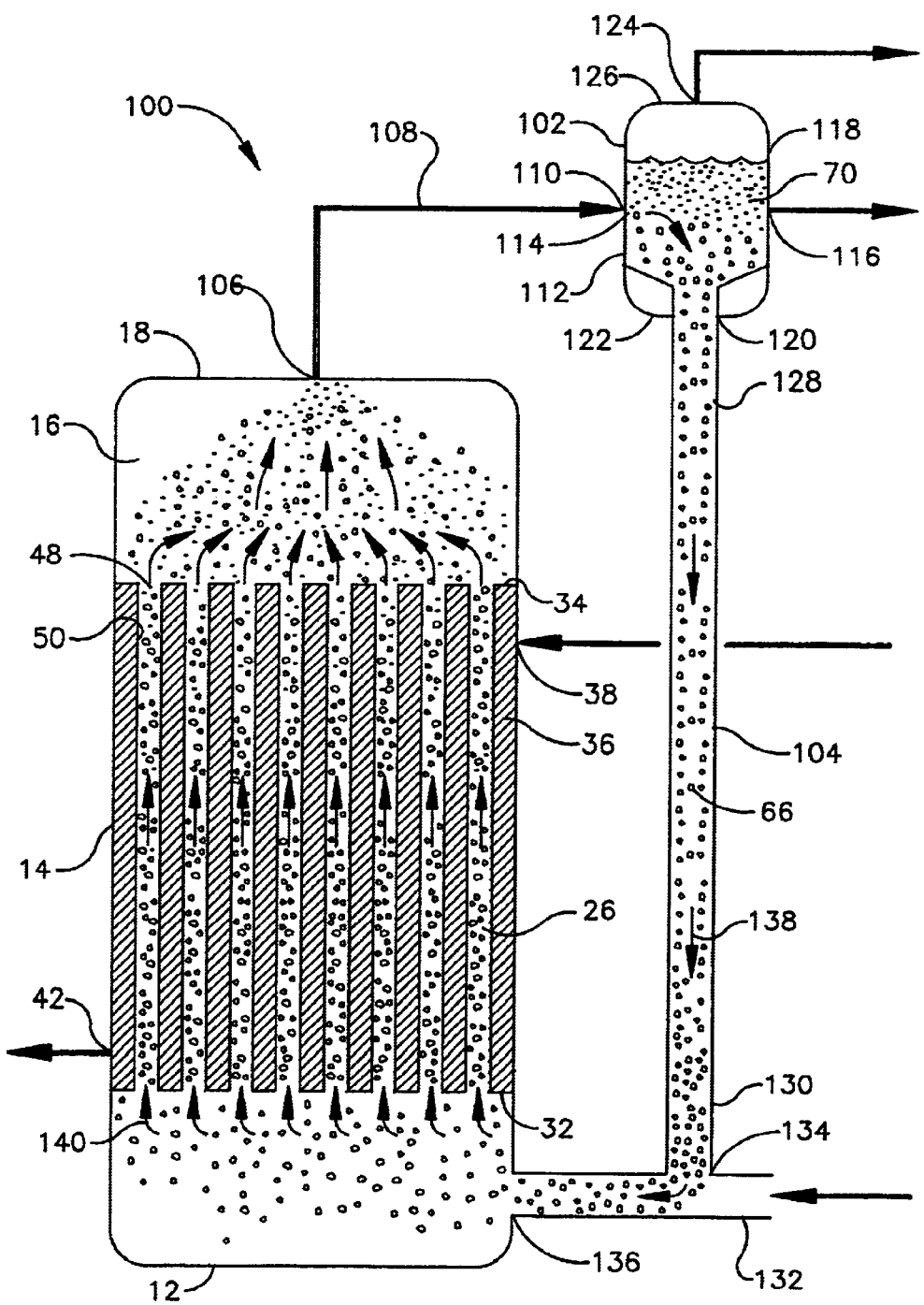
FIG. 2 is a conceptualized cross-sectional view of a second embodiment of a fluidized bed heat exchanger, which is employed in a heat exchanger/condenser system having utility in the process of the present invention.

Referring to FIG. 2, an alternate fluidized bed heat exchanger (FBHX) is shown and designated 100. The FBHX 100 is substantially similar to the FBHX 10 shown in FIG. 1, but the FBHX 100 is specifically adapted for use in an alternate embodiment of the wet gas transport process of the present invention. Accordingly, elements, which are common to both FBHX's 10 and 100, are referred to by the same reference characters. The FBHX 100 is characterized by an externally circulating fluidized bed. As such, the distribution plate and internal downcomer are eliminated and the FBHX 100 is alternatively provided with an external separator 102 and external downcomer 104 in series.

The external separator 102 is in fluid communication with the upper chamber 16 via a product outlet port 106, a product line 108 and a product inlet port 110. The product outlet port 106 is positioned in the FBHX 100 at substantially the same location as the gas hydrate slurry outlet port 58 of the FBHX 10. The product inlet port 110 opens through a vertical side 112 into a middle portion 114 of the external separator 102. The product line 108 extends from the product outlet port 106 to the product inlet port 110. The external separator 102 is also provided with a gas hydrate slurry outlet port 116, which opens through the opposite vertical side 118 at substantially the same vertical level as the product inlet port 110. A solid particle medium outlet port 120 is provided in the bottom 122 of the external separator 102 and a gas vent 124 is provided in the top 126 of the external separator 102. The solid particle medium outlet port 120 is integral with an open upper end 128 of the vertically-aligned external downcomer 104. The external downcomer 104 likewise has an open lower end 130, which intersects a hydrocarbon stream inlet port 132 at a tee junction 134. The hydrocarbon stream inlet port 132 provides fluid communication between the external downcomer 104 and the lower chamber 12 of the FBHX 100 via a fluidizable mixture inlet port 136 positioned at substantially the same location as the hydrocarbon stream inlet port 20 of the FBHX 10.

Operation of the FBHX 100 is substantially similar to that of the FBHX 10 except that the gravity separation of the solid particle medium 66 from the solid gas hydrate particles 70 and remaining fluid components and the recovery of the gas hydrate slurry is performed external to the FBHX 100 in the external separator 102, rather than internally as in the FBHX 10. In particular, the fluidizable mixture, which comprises the solid particle medium 66, solid gas hydrate particles 70, and remaining fluid components, is discharged from the upper chamber 16 into the external separator 102 via the product outlet port 106, product line 108 and product inlet port 110. When the fluidizable mixture reaches the external separator 102, it disperses causing the more dense solid particle medium 66 to separate by gravity from the less dense solid gas hydrate particles 70 and the remaining fluid components in substantially the same manner as described above with respect to separation in the upper chamber 16.

The stable gas hydrate slurry is withdrawn from the external separator 104 via the gas hydrate slurry outlet port 116. The solid particle medium 66 returns to the lower chamber 12 by falling under the force of gravity from the external separator 102 into the vertically aligned open upper end 128 of the external downcomer 104, passing downwardly through the external downcomer 104, and exiting the external downcomer 104 via the open lower end 130 into the tee junction 134 as shown by the arrows 138. The solid particle medium 66 mixes with the hydrocarbon stream entering via the hydrocarbon stream inlet port 132 and is entrained therein to form the fluidizable mixture. The fluidizable mixture enters the lower chamber 12 via the fluidizable mixture inlet port 136 and passes from the lower chamber 12 upward through the tube interiors 48 within the middle chamber 14 as shown by the arrows 140. It is noted that the superficial velocity of the hydrocarbon stream as it is conveyed through the lower chamber 12 of the FBHX 100 is substantially greater as compared to the FBHX 10 because the superficial velocity in the FBHX 100 must be sufficient to maintain the solid particle medium 66 and solid gas hydrate particles 70 entrained in the remaining portion of the initial liquid phase until the fluidizable mixture reaches the external separator 102.

Figure 3:
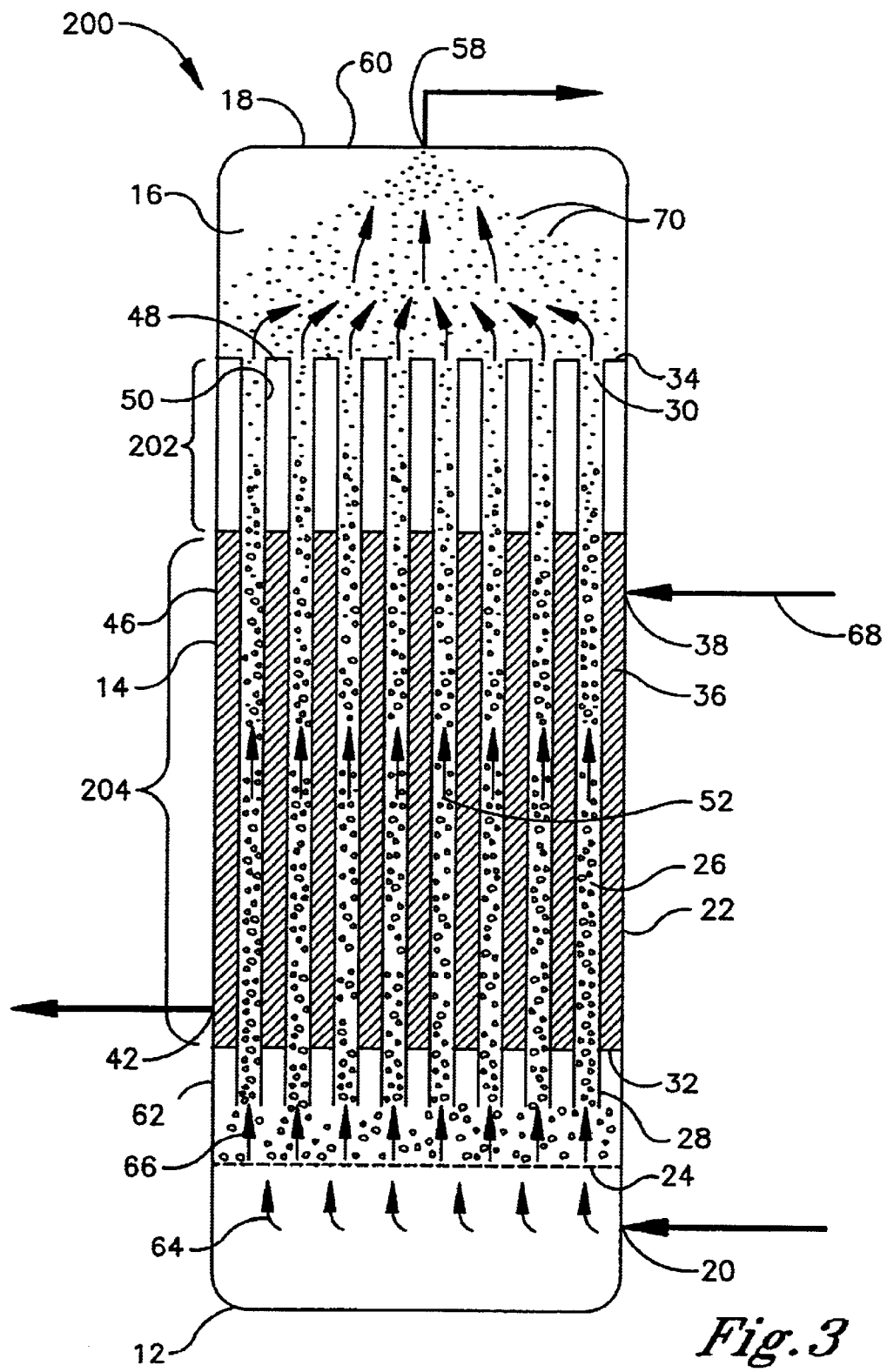
FIG. 3 is a conceptualized cross-sectional view of a third embodiment of a fluidized bed heat exchanger, which is employed in a heat exchanger/condenser system having utility in the process of the present invention.

Referring to FIG. 3, another alternate fluidized bed heat exchanger (FBHX) is shown and designated 200. The FBHX 200 is substantially similar to the FBHX 10 shown in FIG. 1, but the FBHX 200 is specifically adapted for use in yet another alternate embodiment of the wet gas transport process of the present invention. Accordingly, elements, which are common to both FBHX's 10 and 200, are referred to by the same reference characters. The FBHX 200 is characterized by a stationary fluidized bed. As such, the FBHX 200 has no downcomer and the riser tubes 26 extend into the upper chamber 16. The upper portion 202 of the tubes 26, which extends into the upper chamber 16 defines the uncooled separation zone, while the lower portion 204 of the tubes 26, which remains in the middle chamber 14, defines the heat transfer zone.

Operation of the FBHX 200 is substantially similar to that of the FBHX 10 except that gravity separation of the solid particle medium 66 from the solid gas hydrate particles 70 and remaining fluid components is performed in the upper portion 202 of the tube interiors 48, rather than in the freeboard as in the FBHX 10. In particular, the superficial velocity of the bed is reduced by the practitioner in a manner within the purview of the skilled artisan such that the vertical position of each individual particle of the solid particle medium 66 making up the bed remains relatively constant within the middle chamber 14, or at least does not carry past the upper ends 30 of the tubes 26 into the freeboard. Such a bed is characterized as only partially fluidized or "expanded." In other respects, operation of the FBHX 200 is substantially the same as that of the FBHX 10.

Figure 4:
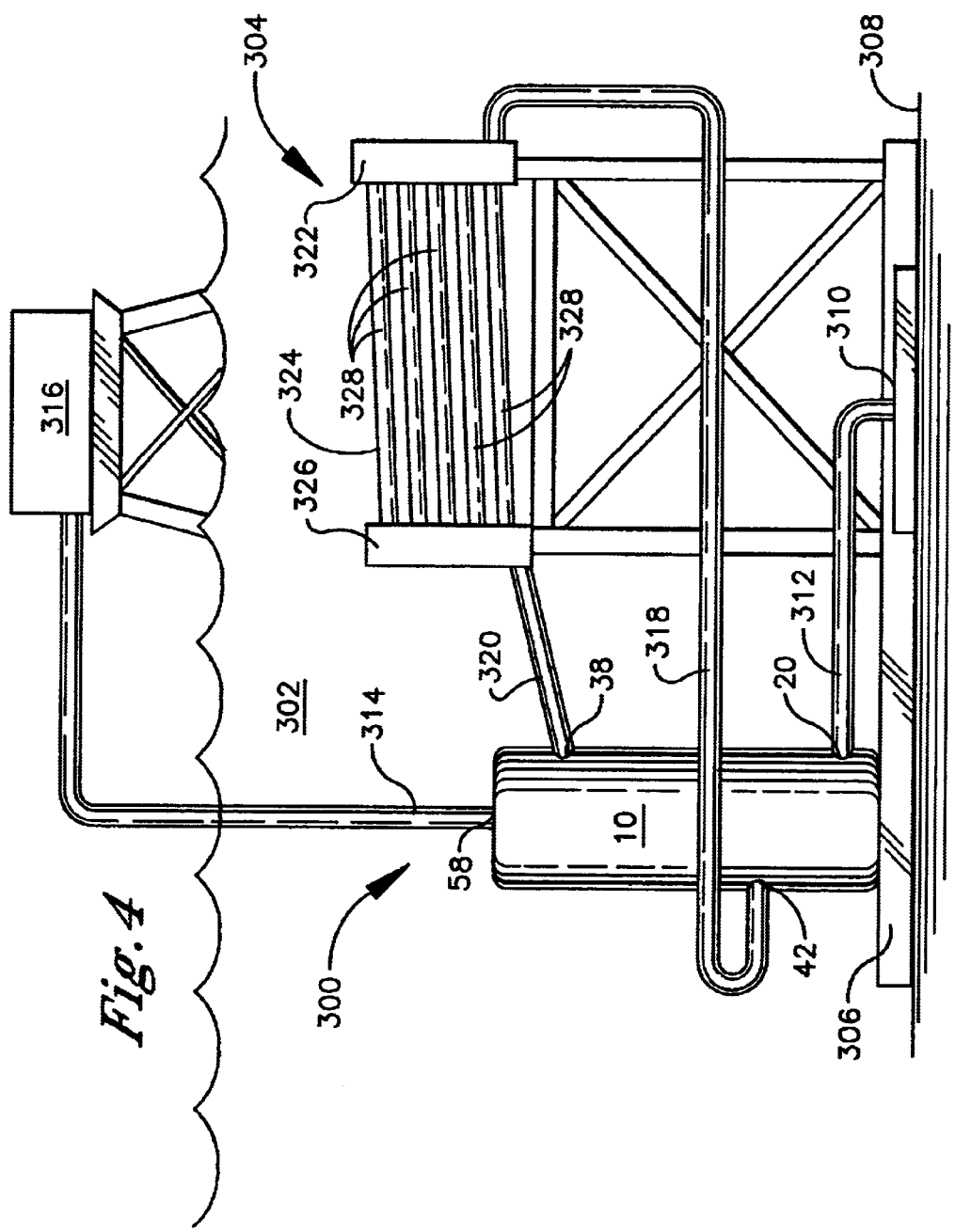
FIG. 4 is a conceptualized perspective view of a heat exchanger/condenser system including the heat exchanger of FIG. 1, 2 or 3, which has utility in the process of the present invention.

Referring to FIG. 4, a heat exchanger/condenser system generally designated 300 is shown, which has specific utility in the wet gas transport process of the present invention. The heat exchanger/condenser system 300 is submerged beneath a body of water 302 and comprises a condenser 304 and either one of the alternate FBHX's 10, 100, or 200 described above. The condenser 304 and the FBHX 10, for example, are mounted on a structural skid 306 with the condenser 304 preferably positioned somewhat higher than the FBHX 10. The skid 306 rests on the sea floor 308 proximal to a subsea well head 310. A hydrocarbon stream line 312, having a relatively short length, extends from the well head 310 into the hydrocarbon stream inlet port 20 of the FBHX 10 (or 132 of FBHX 100). Valving (not shown) is provided at the well head 310 and in the hydrocarbon stream line 312 to regulate flow of the hydrocarbon stream into the FBHX 10. The gas hydrate slurry outlet port 58 of the FBHX 10 (or 116 of FBHX 100) connects with a subsea gas pipeline 314 having a relatively long length, which extends upward to a surface facility 316. The heat transfer medium outlet port 42 of the FBHX 10 connects with a heat transfer medium discharge line 318, which extends to the condenser 304. A heat transfer medium return line 320 extends downward from the condenser 304 into the heat transfer medium inlet port 38 of the FBHX 10.

Although shown herein as an offshore facility, the surface facility 316 may be either an offshore or onshore facility, such as an offshore host platform or an onshore receiving terminal and separation station. In the case of an onshore receiving terminal and separation station, the gas hydrate slurry is heated therein upon receipt to dissociate the gas hydrate. Dissociation of the gas hydrate yields natural gas in the gaseous state, hydrocarbon liquid (either as oil or condensate), and liquid water, all of which have conventional utility.

The condenser 304 comprises a condenser inlet header 322, a condenser pipe bank 324, and a condenser outlet header 326. The condenser inlet header 322 receives the heat transfer medium discharge line 318 and the condenser outlet header 326 connects with the heat transfer medium return line 320. The condenser pipe bank 324 is a plurality of individual condenser pipes 328, which extend in parallel from the condenser inlet header 322 to the condenser outlet header 326 providing a condenser flowpath therebetween for the heat transfer medium. The orientation angle of the condenser pipe bank 324 may be any angle from vertical (90°) to near horizontal (approaching 0°), but not precisely horizontal. As such, the condenser inlet header 322 is at a higher elevation than the condenser outlet header 326 such that the condenser pipe bank 324 slopes downward from the condenser inlet header 322 to the condenser outlet header 326. In a preferred embodiment, the slope is near horizontal and most preferably between about 5 and 10%. The condenser outlet header 326 is likewise at a higher elevation than the heat transfer medium inlet port 38 such that the heat transfer medium return line 320 slopes downward from the condenser outlet header 326 to the heat transfer medium inlet port 38.

Each condenser pipe 328 is enclosed by a wall formed from a heat conductive material. The exterior of the wall is fully exposed to the surrounding water 302, in which the heat exchanger/condenser system 300 is submerged. As such the wall provides an effective condenser heat transfer surface for cooling the heat transfer medium flowing through the condenser pipe 328. External fins (not shown) may also be provided on the exterior of the wall to enhance the transfer of heat from the heat transfer medium through the wall into the surrounding water 302.

Operation of the condenser 304 is effected by withdrawing the heat transfer medium from the heat transfer medium flowpath of the FBHX 10 via the heat transfer medium outlet port 42. The heat transfer medium exiting the FBHX 10 has been heated by the hydrocarbon stream in the FBHX 10 to a condenser inlet temperature of about 5 to 25 C° at a condenser pressure of about 200 to 250 kPa, which vaporizes the entirety or a substantial majority of the heat transfer medium to the vapor phase. The vapor phase heat transfer medium is conveyed upward via the heat transfer medium discharge line 318 to the condenser inlet header 322, which distrbutes the heat transfer medium into the individual condenser pipes 328 of the pipe bank 324. The heat transfer medium flows through the interior of the condenser pipes 328 in continuous contact with the internal side of the pipe walls while the sea water 302 surrounds the external side of the pipe walls. The ambient temperature of the sea water 302 at the sea floor 308 is substantially below the condenser inlet temperature of the heat transfer medium and is typically in a range of about 3 to 10° C., which causes substantial cooling of the heat transfer medium.

The number of condenser pipes 328 and the dimensions of the condenser pipes 328 are selected during design of the pipe bank 324 such that the external surface area of the pipe bank 324 is preferably sufficient to cool the heat transfer medium to a condenser outlet temperature, which is substantially the same as the ambient temperature of the surrounding sea water 302 by the time the heat transfer medium reaches the condenser outlet header 326 at the opposite end of the condenser pipes 328 from the condenser inlet header 322. In all cases, the heat transfer medium is cooled in the pipe bank 324 to a condenser outlet temperature, which is below the vaporization temperature of the heat transfer medium at the condenser pressure, such that the entirety or a substantial majority of the heat transfer medium is condensed from the vapor phase to the liquid phase. Since the pipe bank 324 is sloped downward, the condensed heat transfer medium flows from the condenser pipes 328 into the condenser outlet header 326, which channels the liquid phase heat transfer medium into the heat transfer medium return line 320. The heat transfer medium return line 320 returns the heat transfer medium in the liquid phase back into the heat transfer medium flowpath of the FBHX 10 via the heat transfer medium inlet port 38 where it cools the hydrocarbon stream.

The heat exchanger/condenser system 300 is characterized as being passive since it is nearly free of mechanical moving parts. As such, the heat exchanger/condenser system 300 has a high degree of reliability at a reduced capital and operating expense relative to the prior art.

The following example demonstrates the scope and utility of the present invention, but is not to be construed as limiting the scope thereof.

EXAMPLE

A heat exchanger/condenser system as described above is positioned on the sea floor. The sea water on the sea floor has an ambient temperature of about 4° C. A hydrocarbon stream is fed from a production well head on the sea floor to the FBHX. The hydrocarbon stream has the following approximate composition: 30,000 mscf/day of gaseous hydrocarbon, 750 bbls/day of condensate and 50 bbls/day of water. A heat transfer medium composed of propane in the liquid phase is simultaneously fed to the FBHX at a mass flow rate of approximately 13,800 kg/hr. The propane is vaporized in the FBHX, thereby cooling the hydrocarbon stream to form a gas hydrate slurry. The propane is returned in the vapor phase to the condenser for cooling to the ambient temperature of the sea water, which restores the propane to the liquid phase. Although the performance of the condenser varies as a function of the velocity of the sea currents, the condenser pipe bank will generally require on the order of about 1524 linear meters of 11.4 cm OD pipe to satisfy the demands of the present process.

While the foregoing preferred embodiments of the invention have been described and shown, it is understood that alternatives and modifications, such as those suggested and others, may be made thereto and fall within the scope of the present invention.

We claim:

1. A gas transport process comprising:
providing a heat exchanger having a first heat exchanger flowpath for a heat transfer medium at an initial lower temperature and a second heat exchanger flowpath for a hydrocarbon stream at an initial higher temperature, wherein said hydrocarbon stream includes a gas phase comprising a gaseous hydrocarbon component and an initial liquid phase comprising a liquid aqueous component, and wherein said first heat exchanger flowpath is separated from said second heat exchanger flowpath by an exchanger heat transfer surface in heat conductive communication with said first and second heat exchanger flowpaths;
conveying a liquid phase portion of said heat transfer medium through said first heat exchanger flowpath while contacting said exchanger heat transfer surface with said heat transfer medium to raise said initial lower temperature of said heat transfer medium to a vaporization temperature and convert said liquid phase portion of said heat transfer medium to a vapor phase portion;
entraining a solid particle medium within said hydrocarbon stream to form a fluidizable mixture;
conveying said fluidizable mixture through said second heat exchanger flowpath while contacting said exchanger heat transfer surface with said fluidizable mixture to lower said initial temperature of said hydrocarbon stream to a gas hydrate formation temperature and convert a portion of said hydrocarbon stream to a plurality of solid gas hydrate particles;
forming a gas hydrate slurry comprising said plurality of solid gas hydrate particles and a remaining portion of said initial liquid phase; and
conveying said gas hydrate slurry through a transport pipeline.

2. The process of claim 1 further comprising contacting said exchanger heat transfer surface with said solid particle medium.

3. The process of claim 1 wherein said heat exchanger is submersed in a body of water.

4. The process of claim 1 wherein said hydrocarbon stream is production stream from an offshore well.

5. The process of claim 1 wherein said transport pipeline is submersed in a body of water.

6. The process of claim 5 wherein said transport pipeline extends from said heat exchanger at a lower depth in said body of water to a higher depth in said body of water.

7. The process of claim 6 wherein said gas hydrate slurry is conveyed through said transport pipeline from said lower depth to said higher depth thereby increasing the temperature of said gas hydrate slurry.

8. A gas transport process comprising:
providing a heat exchanger having a first heat exchanger flowpath for a heat transfer medium at an initial lower temperature and a second heat exchanger flowpath for a hydrocarbon stream at an initial higher temperature, wherein said hydrocarbon stream includes a gas phase comprising a gaseous hydrocarbon component and an initial liquid phase comprising a liquid aqueous component, and wherein said first heat exchanger flowpath has a first inlet and a first outlet and said second heat exchanger flowpath has a second inlet and a second outlet, and further wherein said first heat exchanger flowpath is separated from said second heat exchanger flowpath by an exchanger heat transfer surface in heat conductive communication with said first and second heat exchanger flowpaths;
conveying a liquid phase portion of said heat transfer medium from said first inlet through said first heat exchanger flowpath toward said first outlet while contacting said exchanger heat transfer surface with said heat transfer medium to raise said initial lower temperature of said heat transfer medium to a vaporization temperature and convert said liquid phase portion of said heat transfer medium to a vapor phase portion;
conveying said hydrocarbon stream from said second inlet through said second heat exchanger flowpath toward said second outlet while contacting said exchanger heat transfer surface with said hydrocarbon stream to lower said initial temperature of said hydrocarbon stream to a gas hydrate formation temperature and convert a portion of said hydrocarbon stream to a plurality of solid gas hydrate particles;
forming a gas hydrate slurry comprising said plurality of solid gas hydrate particles and a remaining portion of said initial liquid phase;
withdrawing said gas hydrate slurry from said second heat exchanger flowpath via said second outlet and conveying said gas hydrate slurry through a transport pipeline;
providing a condenser having a condenser inlet, a condenser flowpath, and a condenser outlet, wherein said condenser flowpath is enclosed by a condenser heat transfer surface in heat conductive communication with said condenser flowpath;
conveying said vapor phase portion of said heat transfer medium from said first outlet of said first heat exchanger flowpath into said condenser inlet through said condenser flowpath toward said condenser outlet while contacting said condenser heat transfer surface with said heat transfer medium to cool said heat transfer medium to a temperature below said vaporization temperature and convert said vapor phase portion of said heat transfer medium to said liquid phase portion; and conveying said liquid phase portion of said heat transfer medium from said condenser outlet to said first inlet of said first heat exchanger flowpath.

9. The process of claim 8 wherein said heat exchanger is submersed in a body of water.

10. The process of claim 8 wherein said hydrocarbon stream is production stream from an offshore well.

11. The process of claim 8 wherein said transport pipeline is submersed in a body of water.

12. The process of claim 11 wherein said transport pipeline extends from said heat exchanger at a lower depth in said body of water to a higher depth in said body of water.

13. The process of claim 12 wherein said gas hydrate slurry is conveyed through said transport pipeline from said lower depth to said higher depth thereby increasing the temperature of said gas hydrate slurry.

14. The process of claim 8 further comprising immersing said condenser heat transfer surface in a body of water having an ambient temperature substantially less than said vaporization temperature of said heat transfer medium.

15. The process of claim 8 wherein said condenser flowpath angles downwardly from said condenser inlet to said condenser outlet.

16. A gas transport process comprising:

providing a heat exchanger having a first heat exchanger flowpath for a heat transfer medium at an initial lower temperature and a second heat exchanger flowpath for a hydrocarbon stream at an initial higher temperature, wherein said hydrocarbon stream includes a gas phase comprising a gaseous hydrocarbon component and an initial liquid phase comprising a liquid aqueous component, and wherein said first heat exchanger flowpath has a first inlet and a first outlet and said second heat exchanger flowpath has a second inlet and a second outlet, and further wherein said first heat exchanger flowpath is separated from said second heat exchanger flowpath by an exchanger heat transfer surface in heat conductive communication with said first and second heat exchanger flowpaths;

conveying a liquid phase portion of said heat transfer medium from said first inlet through said first heat exchanger flowpath toward said first outlet while contacting said exchanger heat transfer surface with said heat transfer medium to raise said initial lower temperature of said heat transfer medium to a vaporization temperature and convert said liquid phase portion of said heat transfer medium to a vapor phase portion;

entraining a solid particle medium within said hydrocarbon stream to form a fluidizable mixture;

conveying said fluidizable mixture through said second heat exchanger flowpath while contacting said exchanger heat transfer surface with said fluidizable mixture to lower said initial temperature of said hydrocarbon stream to a gas hydrate formation temperature and convert a portion of said hydrocarbon stream to a plurality of solid gas hydrate particles;

forming a gas hydrate slurry comprising said plurality of solid gas hydrate particles and a remaining portion of said initial liquid phase;

withdrawing said gas hydrate slurry from said second heat exchanger flowpath via said second outlet and conveying said gas hydrate slurry through a transport pipeline;

providing a condenser having a condenser inlet, a condenser flowpath, and a condenser outlet, wherein said condenser flowpath is enclosed by a condenser heat transfer surface in heat conductive communication with said condenser flowpath;

conveying said vapor phase portion of said heat transfer medium from said first outlet of said first heat exchanger flowpath into said condenser inlet through said condenser flowpath toward said condenser outlet while contacting said condenser heat transfer surface with said heat transfer medium to cool said heat transfer medium to a temperature below said vaporization temperature and convert said vapor phase portion of said heat transfer medium to said liquid phase portion; and conveying said liquid phase portion of said heat transfer medium from said condenser outlet to said first inlet of said first heat exchanger flowpath.

17. The process of claim 16 further comprising contacting said exchanger heat transfer surface with said solid particle medium.

18. The process of claim 16 wherein said heat exchanger is submersed in a body of water.

19. The process of claim 16 wherein said hydrocarbon stream is production stream from an offshore well.

20. The process of claim 16 wherein said transport pipeline is submersed in a body of water.

21. The process of claim 20 wherein said transport pipeline extends from said heat exchanger at a lower depth in said body of water to a higher depth in said body of water.

22. The process of claim 21 wherein said gas hydrate slurry is conveyed through said transport pipeline from said lower depth to said higher depth thereby increasing the temperature of said gas hydrate slurry.

23. The process of claim 16 further comprising immersing said condenser heat transfer surface in a body of water having an ambient temperature substantially less than said vaporization temperature of said heat transfer medium.

24. The process of claim 16 wherein said condenser flowpath angles downwardly from said condenser inlet to said condenser outlet.

* * * * *